May 14, 1929.  J. ZIMARIK  1,713,248
TIRE RESURFACING MACHINE
Filed Oct. 7, 1926    2 Sheets-Sheet 2
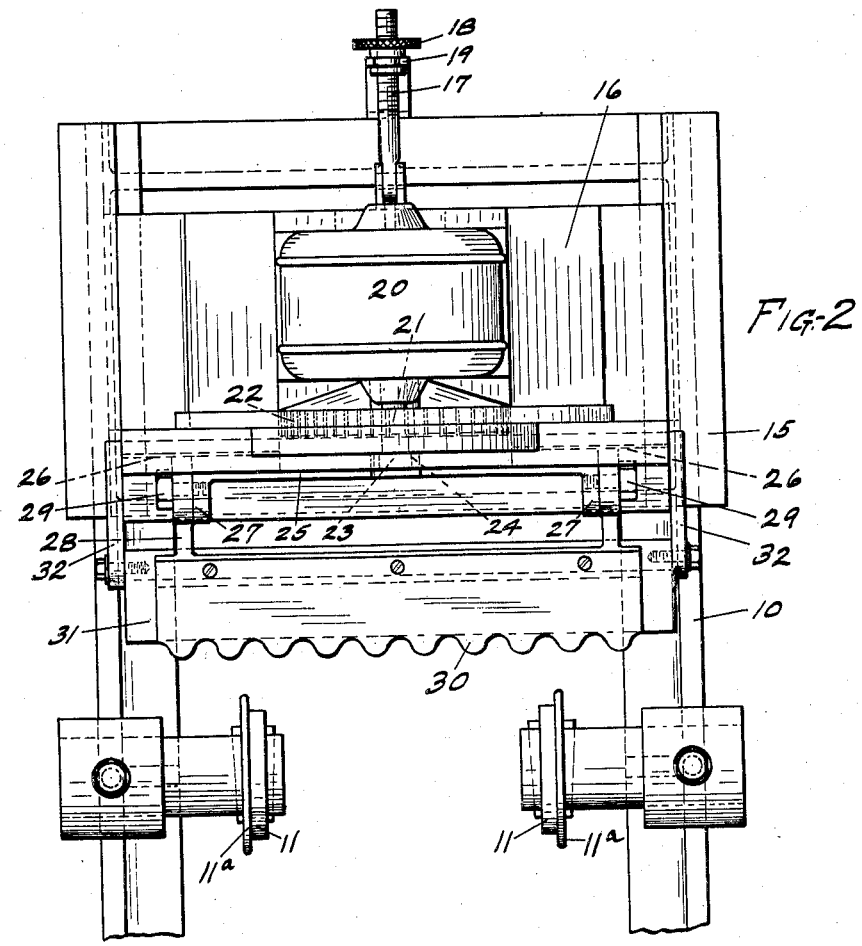
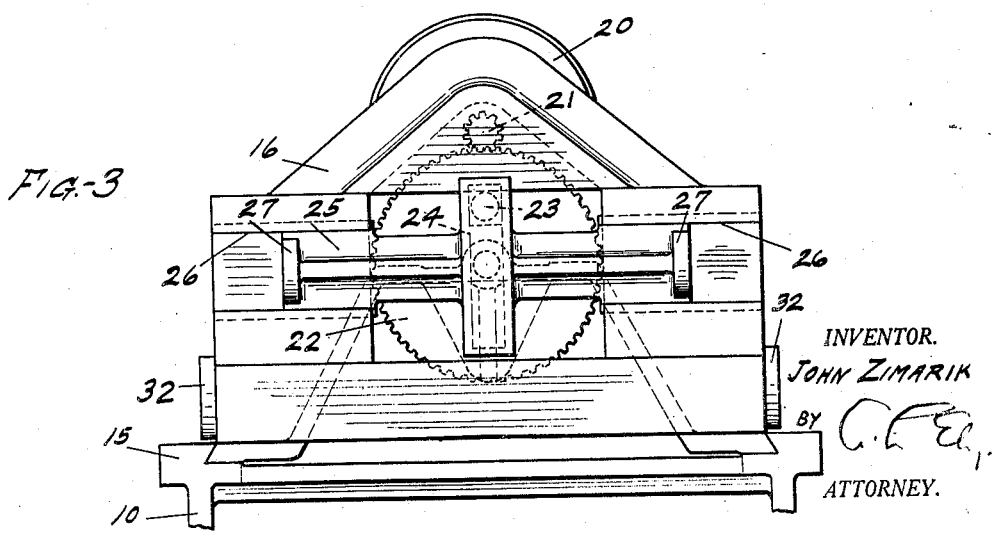
INVENTOR.
JOHN ZIMARIK
BY
ATTORNEY.

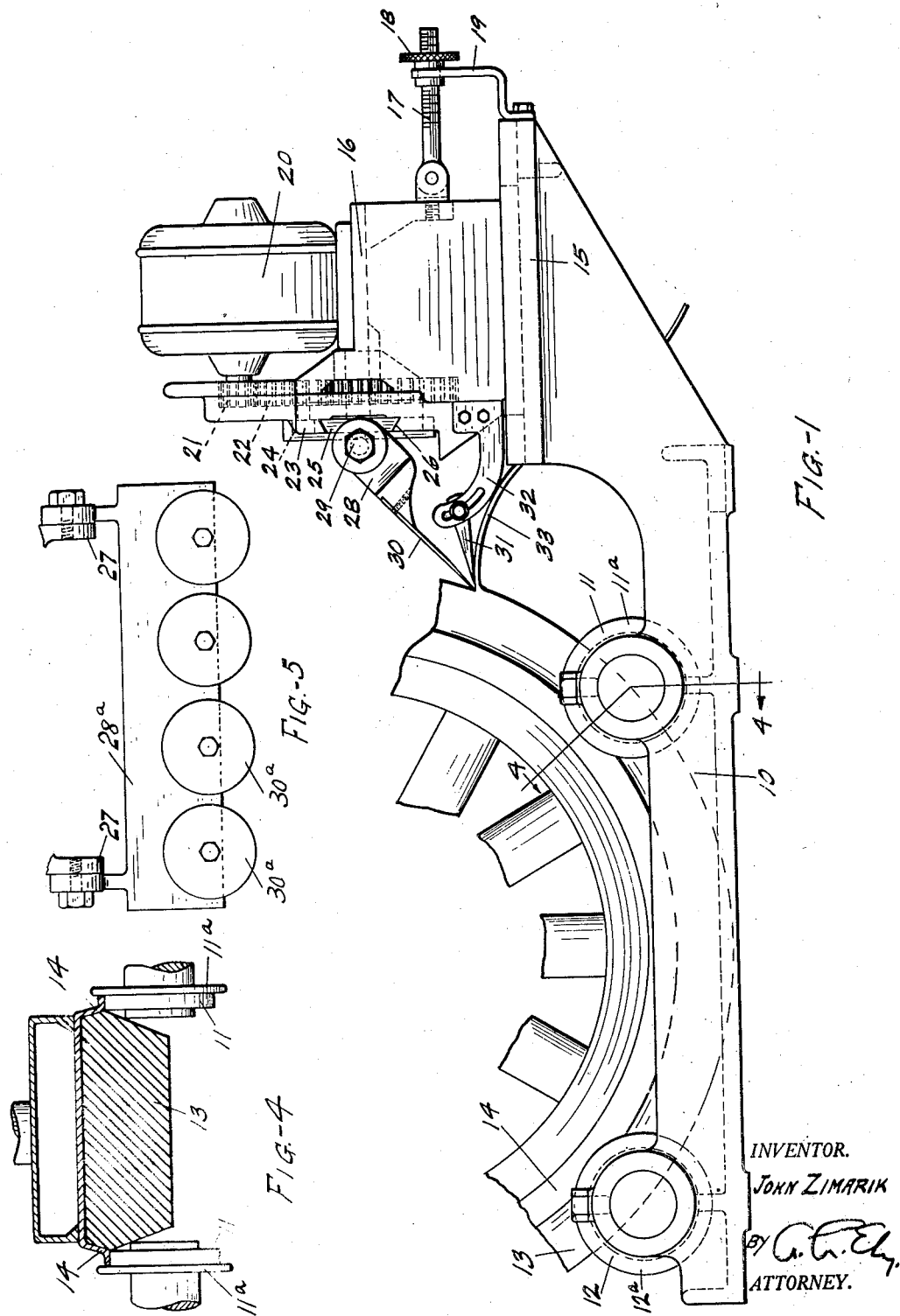

Patented May 14, 1929.

1,713,248

UNITED STATES PATENT OFFICE.

JOHN ZIMARIK, OF AKRON, OHIO, ASSIGNOR TO THE PORTAGE MACHINE AND ENGINE COMPANY, OF AKRON, OHIO, A CORPORATION OF OHIO.

TIRE-RESURFACING MACHINE.

Application filed October 7, 1926. Serial No. 140,058.

This invention relates to machines for resurfacing solid or cushion tires.

Solid or cushion tires, such as employed upon trucks or the like, usually wear unevenly or chip or break under the action of heavy loads or because of encountering sharp obstacles, etc. Such tires accordingly ride unevenly and rapidly become useless, due to the localization of stresses therein.

The present invention has for its general object the provision of an effective apparatus for resurfacing solid tires so that a smooth wearing surface will be provided thereon.

Particularly the invention contemplates a device in which a solid or cushion tire may be resurfaced either while mounted on the vehicle or demounted therefrom.

A specific object of the invention is to provide a support in which a tire is revoluble and to provide a resurfacing tool arranged for cooperation with a tire revolving on said support to resurface the same.

A further object of the invention is to provide in such a device a reciprocable knife arranged to operate transversely of the tire in the maner of a saw and adjustable with respect to the support to be capable of operation on tires of different sizes and to take cuts of determinate depths thereon.

A further object of the invention is to provide in apparatus of this class, means for separating the cut layer of rubber from the body of rubber being cut in such a way that friction of said layer on the knife will not hinder the cutting operation.

The foregoing and other objects of the invention are obtained by the construction illustrated in the accompanying drawings and described below. It is to be understood that the invention is not limited to the specific form thereof shown and descirbed.

Of the accompanying drawings:

Figure 1 is a side elevation of apparatus embodying the invention shown in operation upon a solid tire;

Figure 2 is a part plan thereof;

Figure 3 is a front elevation with the knife and knife holder removed;

Figure 4 is a section on line 4—4 of Figure 1; and

Figure 5 is a plan of a modified cutter for the apparatus.

Referring to the drawings, 10 designates a base or supporting frame in which is journaled spaced pairs of rollers 11, 11 and 12, 12, provided with flanges $11^a$ and $12^a$ respectively, so as to support a solid or cushion tire indicated at 13 by engagement with the peripheral flanges 14, 14 on the metal bases of such tires as shown in Figures 1 and 4. For supporting tires of different sizes, rollers of each pair 11 and 12 are adjustable from and toward each other, being axially adjustable in their bearings by suitable means such as shown.

Base frame 10 is formed with an elevated support or bracket 15 arranged to mount the resurfacing mechanism in such relation as to be operable upon the periphery of a tire such as 13 supported upon rollers 11 and 12. This mechanism includes a support 16 bodily movable on bracket 15 toward or from the periphery of a tire resting on rollers 11 and 12 by means of a screw link 17 threaded through a nut 18 removably journaled in a forked bracket 19, from which the link 17 may be swung upwardly to quickly withdraw the resurfacing mechanism from the tire should it bind upon the tire for any reason, such as encountering a stone or other hard object embedded within the tire.

On support 16 there is mounted a motor 20 having thereon a pinion 21 meshed with a gear 22 journaled on support 16 and having a pin 23 thereon engaged in a slot 24 in a slide 25 reciprocable transversely in guides 26, 26 formed on bracket 16. Slide 25 is formed with apertured lugs 27, 27 on which is mounted, so as to be angularly adjustable, a knife blade support 28, cap screws 29, 29 being employed to secure the support 28 in adjusted position. Secured on support 28 is a knife 30 preferably having a corrugated cutting edge as shown (Figure 2). In Figure 5 a modified form of cutter is shown. A support $28^a$ similar to support 28 has mounted thereon a series of disc cutters $30^a$, $30^a$ adapted to be secured on support $28^a$, as by bolts $28^b$, $28^b$ so as to be adjusted to any desired angular position thereon, whereby if one or more of the discs are dulled as by encountering a nail in a tire, they may be angularly adjusted to present a fresh cutting edge.

In order to reduce the friction of the rubber on the knife 30 to a minimum, a separator wedge-like member 31 is arranged to project in the cut adjacent the point of cutting so as progressively to fold the cut strip away from the tire. This member may be adjustably mounted on bracket 16 to secure it at different elevations and at different angles by being bolted into spaced, upwardly curved, slotted members 32.

The operation of the device is as follows:

If the tire to be resurfaced is on the truck or other vehicle, the vehicle may be jacked up so that the device may be placed beneath the tire to be resurfaced. The jack is then operated to lower the tire onto rollers 11 and 12. If an unmounted tire is to be resurfaced, it may simply be mounted upon rollers 11 and 12 as illustrated in Figure 4. In either case the tire is then revolved slowly in any suitable way, as by attaching a hand crank (not shown) to the vehicle wheel. While the tire is slowly rotated, the cutter mechanism which is adjusted, as will be understood, to take the desired depth of cut is continuously operated, motor 20 through the mechanism described rapidly reciprocating knife 30 transversely of the tire. The strip indicated at 33 is folded downwardly from the point of cutting by separator member 31 and passes out between the members of the base frame providing the support 15.

It will be apparent that a simple, effective device has been provided for resurfacing tires. It will also appear that modifications of the invention may be resorted to without departing from the spirit thereof or the scope of the appended claims.

What is claimed is:

1. Apparatus for resurfacing solid or cushion tires, comprising a portable support adapted to be placed beneath the wheel of a vehicle, means on the support for revolubly supporting the tire thereon by engagement with the base of the tire on its periphery and sides, a resurfacing device, means for adjusting the device toward and from the periphery of the tire including interengaging means adapted to be released to permit rapid movement of the device away from the tire, a reciprocable knife on the device, said knife being angularly adjustable with respect to the periphery of the tire, means on the device for reciprocating the knife, and means on the device for folding the cut strip away from the point of cutting, said last named means including a wedge angularly and vertically adjustable in the plane of rotation of a tire.

2. Apparatus for resurfacing solid or cushion tires, comprising a support, means on the support for revolubly supporting the tire thereon by engagement with the base of the tire on its periphery and sides, a resurfacing device adjustable toward and from the periphery of a tire on said support, a reciprocable knife on the device, said knife being angularly adjustable with respect to the periphery of the tire, means on the device for reciprocating the knife, and means on the device for folding the cut strip away from the point of cutting.

3. Apparatus for resurfacing solid or cushion tires, comprising a support, means on the support for revolubly supporting the tire thereon, a resurfacing device adjustable toward and from the periphery of a tire on said support, a reciprocable knife on the device, said knife being angularly adjustable with respect to the periphery of the tire, means on the device for reciprocating the knife, and means on the device for folding the cut strip away from the point of cutting.

4. Apparatus for resurfacing solid or cushion tires, comprising a support, means on the support for revolubly supporting the tire thereon by engagement with an outer peripheral portion of the tire, a resurfacing device adjustable toward and from the periphery of a tire on said support, a reciprocable knife on the device, means on the device for reciprocating the knife, and means on the device for folding the cut strip away from the point of cutting.

5. Apparatus for resurfacing solid or cushion rubber tires, comprising a support, means on the support for revolubly supporting the tire thereon by engagement with the outer periphery thereof, a resurfacing device adjustable toward and from the periphery of a tire on said support, a reciprocable knife on the device for cutting a strip of rubber from the peripheries of the tire, and means on the device for reciprocating the knife.

6. In a rubber tire resurfacing device, a support for engaging an outer peripheral portion of a tire so that the tire may be rotated upon the support, means for cutting a layer of rubber as a strip from the periphery of a tire while it is rotated on said support, said cutting means including a reciprocable knife operable on the outer periphery of the tire to cut said strip, and means for continuously reciprocating said knife.

7. In a rubber cutting machine, a cutter comprising a support and a series of cutter blades aligned in the same plane on the support to provide, in effect, a corrugated cutter, each blade being capable of angular adjustment thereon to provide a fresh cutting edge.

8. Apparatus for resurfacing solid rubber tires having side flanged metal rims or bases, said apparatus comprising means for supporting a tire by engagement with the flanges of its rim or base, whereby the tire may be circumferentially rotated thereon, and means on the supporting means operable against the tire to trim a layer of rubber as a strip from the peripheral surface thereof.

JOHN ZIMARIK.